US012742569B2

(12) United States Patent
White

(10) Patent No.: US 12,742,569 B2
(45) Date of Patent: Sep. 22, 2026

(54) ELECTRIC FLUID HEATER

(71) Applicant: Digital Heat Limited, Bexhill-On-Sea (GB)

(72) Inventor: Matthew White, Haywards Heath (GB)

(73) Assignee: Digital Heat Ltd., Bexhill-On-Sea (GB)

( * ) Notice: Subject to any disclaimer, the term of this patent is extended or adjusted under 35 U.S.C. 154(b) by 0 days.

(21) Appl. No.: 18/695,105

(22) PCT Filed: Oct. 25, 2022

(86) PCT No.: PCT/GB2022/052712

§ 371 (c)(1),
(2) Date: Mar. 25, 2024

(87) PCT Pub. No.: WO2023/073357

PCT Pub. Date: May 4, 2023

(65) Prior Publication Data

US 2024/0337417 A1 Oct. 10, 2024

(30) Foreign Application Priority Data

Oct. 27, 2021 (GB) ..................................... 2115478

(51) Int. Cl.

| | |
|---|---|
| ***F24H 15/156*** | (2022.01) |
| ***F24H 1/10*** | (2022.01) |
| ***F24H 15/168*** | (2022.01) |
| ***F24H 15/37*** | (2022.01) |
| ***H02J 7/00*** | (2026.01) |

(52) U.S. Cl.

CPC ........... *F24H 15/156* (2022.01); *F24H 1/101* (2013.01); *F24H 1/107* (2013.01); *F24H 15/168* (2022.01); *F24H 15/37* (2022.01); *F24H 2240/01* (2013.01); *H02J 7/855* (2026.01)

(58) Field of Classification Search

None

See application file for complete search history.

(56) References Cited

U.S. PATENT DOCUMENTS 4,488,865 A 12/1984 David
4,937,430 A * 6/1990 Belloni .................. F22B 1/285 219/512
5,479,558 A * 12/1995 White, Jr. ............ F24H 9/2028 219/509

(Continued)

FOREIGN PATENT DOCUMENTS

CA 3101852 A1 * 6/2022 ............ F24H 1/185
CN 101387440 A 3/2009

(Continued)

*Primary Examiner* — Thor S Campbell

(74) *Attorney, Agent, or Firm* — Kevin J Fournier Intellectual Property Legal Services Ltd; Kevin J Fournier

(57) ABSTRACT

There is disclosed a partially or wholly electric fluid heater (1) arranged to heat fluid in a first circuit, the fluid comprising heating fluid or tap water. The heater comprises a first electric heating element (8) arranged to heat fluid in the first circuit. The first heating element is arranged to be powered by both an AC power supply (22) and a DC power supply (20). The heater also comprises a controller (24) arranged to control distribution of power to the first heating element from the DC power supply and the AC power supply.

20 Claims, 6 Drawing Sheets

(56) References Cited

U.S. PATENT DOCUMENTS 6,424,801 B1 * 7/2002 Rabadi .................... F24H 1/102 392/450
8,977,117 B2 * 3/2015 Kreutzman ........... F24H 15/172 392/501
2003/0021597 A1 * 1/2003 Chu ...................... F24H 15/414 392/390
2004/0161227 A1 * 8/2004 Baxter .................. F24H 9/2021 392/454
2010/0193492 A1 * 8/2010 Hughes ................... F24H 1/103 219/162
2011/0041781 A1 2/2011 Deivasigamani et al.
2011/0238232 A1 * 9/2011 Tomita ...................... H02J 3/32 700/297
2011/0240623 A1 * 10/2011 McGaugh ............. H05B 1/028 219/202
2012/0315024 A1 12/2012 Obst et al.
2013/0094840 A1 * 4/2013 Seitz ....................... F24H 1/202 392/449
2013/0193221 A1 * 8/2013 Buescher .............. F24H 15/238 237/8 A
2013/0266296 A1 * 10/2013 Kreutzman .............. H05B 3/48 392/308
2013/0266300 A1 10/2013 Kreutzman
2014/0023352 A1 * 1/2014 Jurczyszak ........... F24H 15/395 392/465
2014/0105586 A1 * 4/2014 Gallet ..................... F24H 1/101 392/465
2014/0153913 A1 6/2014 Newman et al.
2014/0257584 A1 * 9/2014 Tanimoto ............... G06Q 50/06 700/291
2018/0238563 A1 * 8/2018 Stepa .................. F24D 19/1057
2019/0074695 A1 * 3/2019 Motsenbocker ........ F24H 1/185
2020/0333045 A1 * 10/2020 Kernich ................ F24H 9/2021
2021/0270471 A1 * 9/2021 Hayden .................. G05B 15/02

FOREIGN PATENT DOCUMENTS

CN 206160458 U * 5/2017
CN 113465183 A 10/2021
FR 002074687 A1 10/1971
GB 2446159 A 8/2008
GB 2592093 A 8/2021
WO WO81/00611 A1 3/1981
WO WO 2007/109829 A1 10/2007
WO WO 2014/033328 A1 3/2014
WO WO2019/169502 A1 9/2019
WO WO 2020/199264 A1 10/2020
WO WO2023/073356 A1 5/2023
WO WO2023/073358 A1 5/2023

* cited by examiner 408
406
400
402
410
414
412
404
SECTION D-D

D
D

ELECTRIC FLUID HEATER

FIELD

This invention relates to electric heaters for fluid heating systems. In particular, but not exclusively, the invention relates to electric boilers for wet heating systems or electric furnaces for air heating systems, both of which can supply heated fluid for heating spaces (such as via radiators) or heated tap water or both.

BACKGROUND

Gas boilers can provide wet heating solutions for hot water and heating needs. For example, a domestic gas boiler will often supply hot water for heating radiators within a heating system and also provide on-demand hot water to taps (e.g. for drinking, cleaning, washing). The two supplies (heating and tap) are kept separate since the heating water can become dirty as it passes through a radiator circuit, whereas tap water must be clean. Combination ("combi") boilers are popular as they provide all of this functionality within a sealed, high pressure environment within a single boiler housing with a relatively small physical footprint. Other types of boilers having separate tanks or cylinders are also used.

Gas boilers burn fossil fuel. As a result, electric boilers are now emerging as an environmentally friendly alternative. An electric boiler will pass the water via an electric heating element.

An electric combi boiler uses similar technology to an electric kettle. The electric boiler is connected to the mains electricity supply and is supplied with cold water from the mains. When hot water is requested (e.g. when a hot water tap is opened or the heating is switched on), the heating element inside the electric boiler heats up and passes this heat to the cold water. The heated water is then pumped to the tap or radiator where it is needed.

Storage electric boilers include a hot water tank (either an internal tank within the unit or an external tank). This enables heating and storage of water at times when energy costs are lower (e.g. overnight) for subsequent use at times when energy costs are higher (e.g. the next day). Such systems take up more space.

Along the same theme, but offering some of the advantages of a combi boiler, a combined primary storage unit (CPSU) has the central heating boiler and hot water cylinder combined in one big housing—this provides large amounts of hot water whenever required. However, a lot of space is required to house this system.

All of these electric boiler systems use heating elements powered by the AC (alternating current) mains supply.

The inventors have realised that a better electric boiler can be produced and have created the claimed solution.

SUMMARY

According to a first aspect of the present invention, there is provided a fluid heater as claimed in claim 1. Advantageously, a fully electric or hybrid electric fluid heater that can use a combination of DC power and AC power (i.e. need not rely on AC input) is provided. This type of heater is able to make intelligent use of available electric power supply options and thereby work more efficiently whilst providing high performance and in an eco-friendly manner. The intelligent mix of AC and DC power sources reduces the risk of overwhelming household electric supplies or a local grid (e.g. at peak demand times). Furthermore, a fluid heater having a typically higher peak power may be provided). Furthermore, intelligent use of DC power is useful in a mains AC power cut scenario.

Optional features of the invention are as claimed in the dependent claims—various advantages are thereby provided as discussed in the detailed description. These optional features add efficiency and intelligence to the inventive heater setup. Any of these optional features may be combined with any other of the optional features as will be appreciated by those skilled in this art.

BRIEF DESCRIPTION OF DRAWINGS

Embodiments will now be described by way of example only with reference to the accompanying drawings, in which.

DESCRIPTION OF EMBODIMENTS

The exemplary embodiments described in the detailed description and claims are not meant to be limiting. Other embodiments may be used, and other changes may be made, without departing from the scope of the invention. Various embodiments are described. The specific embodiments are not intended as an exhaustive description or as a limitation to the broader discussed and claimed aspects. Features described in conjunction with a particular embodiment are not necessarily limited to that embodiment and can be incorporated into any other embodiment(s). Protection afforded by any applicable doctrine of equivalents is retained to its fullest extent.

Terms such as up, down, top, bottom, left, right, inner, outer, vertical, upstanding etc. have been used to describe the invention simply and clearly. These terms are not to be interpreted in a manner that would be limiting. The person skilled in the art will envisage other suitable embodiments within the scope of the invention.

Figure 1:
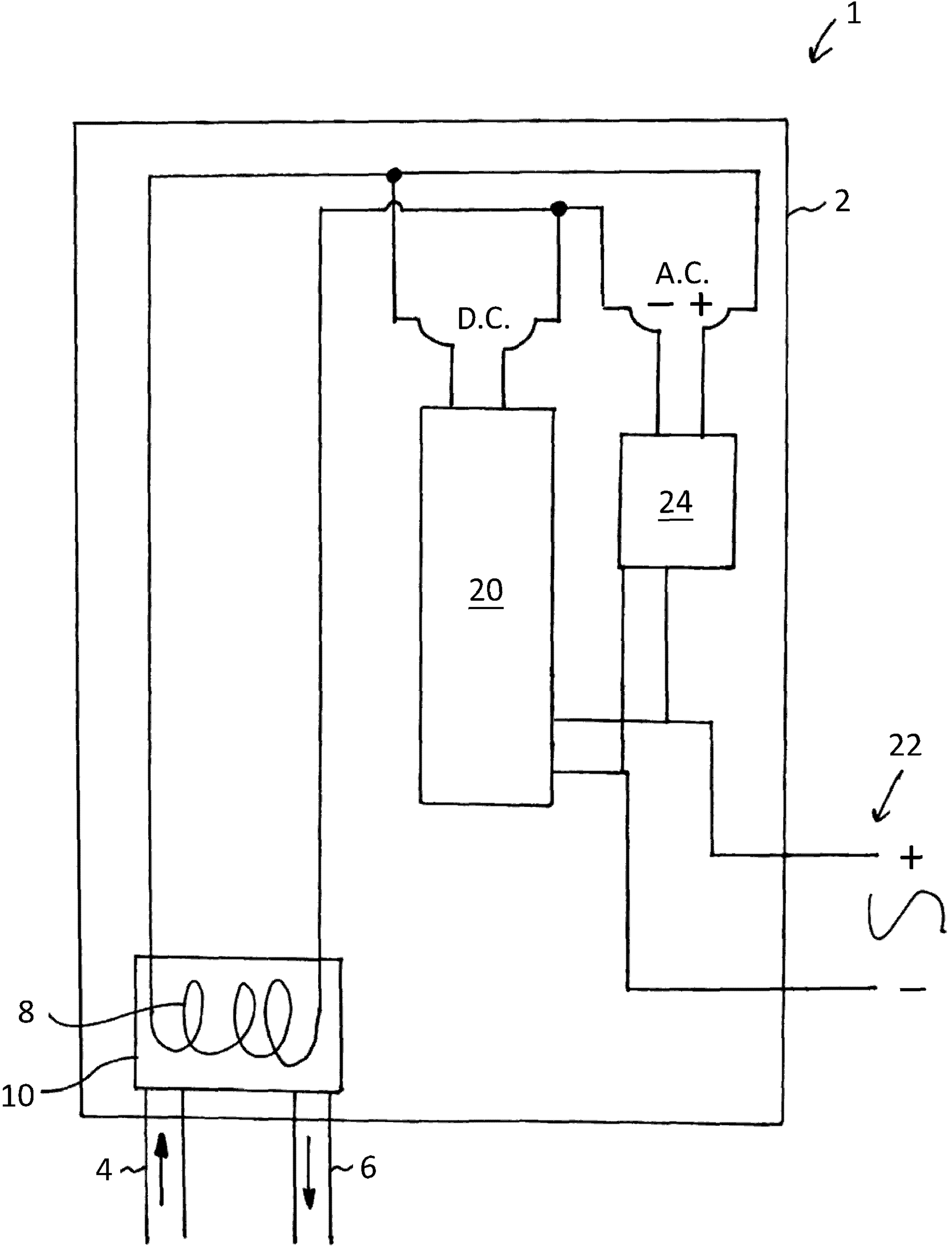
FIG. 1 shows a schematic view of a boiler according to a first aspect of the invention.

Referring to FIG. 1, there is shown schematically a fluid heater in the form of a water heater 1 (also referred to as a boiler herein) used to heat water for use in a standard fluid circuit, such as a radiator heating water circuit. Various aspects of the boiler and boiler system will be described in detail with reference to non-limiting examples. Other details will be apparent to the skilled person. In particular, aspects (including undescribed aspects) of known boiler systems can be incorporated and used with this invention by the skilled person.

Generally, the boiler may be a tank-type boiler (known also as a system boiler), or a combi boiler, or any other known boiler type, or a furnace heater, such as an furnace air heater. The skilled person will be able to adapt the described embodiments to boiler types other than those described. As is known, these boiler types can be used to supply heating water (e.g. to a radiator circuit) or potable water (e.g. to a circuit of taps) or both. In other examples, instead of heating radiator water, there may be another type of heating fluid flowing through the heating system, e.g. another liquid, another gas (e.g. air) or oil or any combination thereof.

Such fluid circuits are well known in the field. The, any or each fluid circuit may be a substantially sealed fluid circuit in use and optionally may be pressurised. In a potable water circuit, pressure from the mains or gravity fed source drives water such that when a faucet/tap is opened, water flows out of tap in normal use. Typically, a radiator circuit is substantially scaled in normal use. Bleed points or pressure release points may be provided at convenient locations to allow inspection or pressure release or fluid release for maintenance and repair. It is known to use expansion tanks or expansion vessels (which are small tanks used to protect closed (not open to atmospheric pressure) fluid heating systems and domestic hot water systems from excessive pressure). Typically, expansion tanks are partially filled with air, whose compressibility dampens shock caused by water hammer and absorbs excess water pressure caused by thermal expansion. In an air heater, the fluid circuit usually comprises at least one vent through which heated air exits to the space to be heated. In such circuits, the air within the circuit is not sealed from the environment—it is typically at atmospheric or ambient pressure. In some such systems, air is drawn into the furnace during normal operation, heated and then blown around the heated network.

In this example, the water heater 1 is a system boiler and comprises a boiler housing 2 to house its components. Often the boiler of this invention will be required to fit in a small space. In many examples, this invention includes features that make the boiler compact to allow the boiler to fit within the same housing or space footprint as a typical known boiler, even though the inventive boiler comprises a new component (as will be described in more detail below).

The boiler 1 is arranged to heat water in a first circuit, wherein the first circuit is a heating water circuit. The heating water circuit comprises multiple components, including standard domestic radiators (not shown) in addition to the boiler 1. Water is used as the heating fluid within the first circuit in this example; other known heating fluids can be used in other examples.

Relatively cold water from the first circuit enters the boiler 1 via a cold water input pipe 4, is heated and then relatively hot water exits the boiler 1 to the first circuit via a hot water output pipe 6.

The boiler 1 comprises an electric boiler vessel 10, which is located within the housing 2 between the input 4 pipe and output 6 pipe. The electric boiler vessel 10 is a closed, sealed vessel containing a first electric heating element 8 arranged to heat water passing through the vessel 10.

As per this invention, the first electric heating element 8 communicates with both a DC power supply and an AC power supply such that it can be powered by either or both of them.

In this example, the DC power supply is in the form of a battery pack 20, which is part of the heater 1 and is also located within the housing 2. In other examples, the DC power supply may be located externally of the heater.

In this example, the AC power supply comprises mains electric power 22 (also known as "utility power", "household power", "household electricity", "house current", "powerline", "domestic power", "wall power", "line power", "AC power", "city power", "street power", "hydro").

The boiler also comprises a controller 24 arranged to control distribution of power to the first heating element 8 from the DC and AC power supplies 20, 22. The controller may be implemented in hardware or software or a combination thereof, as will be apparent to those skilled in the art.

In some examples, the controller is computer controlled and arranged to control the amount of heating supplied to the fluid based on or in response to any one or more control factors, the control factors comprising: amount of heating required; fluid input temperature at an input point in the one or more fluid circuits; fluid output temperature at an output point in the one or more fluid circuits; fluid temperature at any predetermined point in the one or more fluid circuits; amount of heating capacity available from the first heating element; amount of heating capacity available from the combustible fuel burner; instantaneous demand for heating fluid or potable water; forecasted demand for heating fluid or potable water; and flow rate of fluid to be heated.

Furthermore, in some examples, the fluid heater comprises one or more sensors (not shown) arranged to sense information relating to the one or more control factors and to provide said control factor information to the controller. Some of the sensors are located inside the boiler housing (e.g. to measure water temperature or flow rates within the boiler). Some of the sensors are located outside the boiler housing (e.g. to measure water temperature or flow rates at a desired location in the first circuit outside the boiler, such as in a room of a building). The controller acts in response to information from such sensors to instruct heating of the fluid by the fuel burner and electric heating element.

In some examples, the controller may have a memory (not shown) associated therewith (either integrally or separately), the memory being arranged to store information about any one or more aspects of the system, such as historic or sensed information relating to any of the control factors, control factor information, sensed information from any of the sensors, desired output information (e.g. desired room temperature). The controller is able to access information from the memory in a known manner. The controller and memory may be implemented in a standard computerised network and system.

In this example, the controller 24 comprises (not shown) a hardware thermostatic controller and optionally a further GUI thermostatic controller such that a user can easily input desired fluid heating demands and easily receive feedback on fluid heating operating parameters in a known manner.

In this example, the controller 24 also includes (not shown) an AC power supply adapter arranged to interface with the external AC power supply 22 to deliver AC power to the heating element 8 within a desired power configuration. Although not present in this embodiment, in some embodiments, similarly a DC power supply adapter located between the DC power supply and the heating element is arranged to interface with the DC power supply 22 to deliver DC power to the heating element within a desired power configuration.

The controller is arranged to take into account a number of factors when controlling apportionment of power to the heating element. In some cases (at any given time), it will be desirable to use the DC supply only: in other cases (at any given time), it will be desirable to use the AC supply only; and in other cases (at any given time), it will be desirable to use a combination of the DC and AC power supplies.

The controller is configured to control relative distribution of power from the DC and AC power sources taking into account any one or more of: the capacity of the or each heating element (e.g. what is the maximum safe load (e.g. peak power or duration of continuous powering) of a particular heating element); the capacity of the or each power supply; instantaneous demand for heating water or tap water (e.g. has a tap just been turned on/has a radiator just been activated from cold); forecasted demand for heating water or tap water; and instantaneous or forecasted available supply type. The controller may also be configured to provide a seamless switch from predominantly using the DC power supply to using the predominantly AC power supply, e.g. as the DC battery exhausts, the AC power supply takes over gradually, whilst the power output stays substantially constant or at a desired level. The controller may also control smart charging of the DC power supply such that heat and charge level (of the DC battery) are taken into account when controlling charging (e.g. whether to charge aggressively/quickly or more slowly).

In some examples, the first heating element may have a preferred power demand range and the controller is arranged to supply power within the preferred power demand range whilst varying the proportion of AC to DC power to the first heating element from 0:100 to 100:0 of AC:DC. In cases where demand is met entirely or largely by the DC power supply, a relatively large DC power supply may be needed. In some examples, the DC power supply is of a size such that 100% of the heating demand cannot be met solely by the DC power source. In other examples, a large DC power supply is provided and such demand can be met solely by the DC power source (see examples described later in this document).

In this example, the boiler is a fully electric boiler. i.e. the heat source is all electric. In other examples, the boiler may be part electric, e.g. part electric and part gas, or part electric and part other combustible fuel-a suitable combustible fuel may be a combustible fluid such as natural gas, hydrogen gas, or propane gas or methane gas, or ethane gas, or butane gas, or a suitable combustible oil or a combustible solid or mulch, such as woodchip or wood pellet, or any combination thereof. In this way, some of the heating power is provided by the electric (DC and AC) component and some of it is provided by more traditional burnt fuel. This can help to add redundancy within the system, or can be used to operate efficiently in an environment where one or other power source is scarce. In this invention, the combined DC and AC power sources are large enough to supply all or nearly all of the power output of a typical boiler if required.

Figure 2:
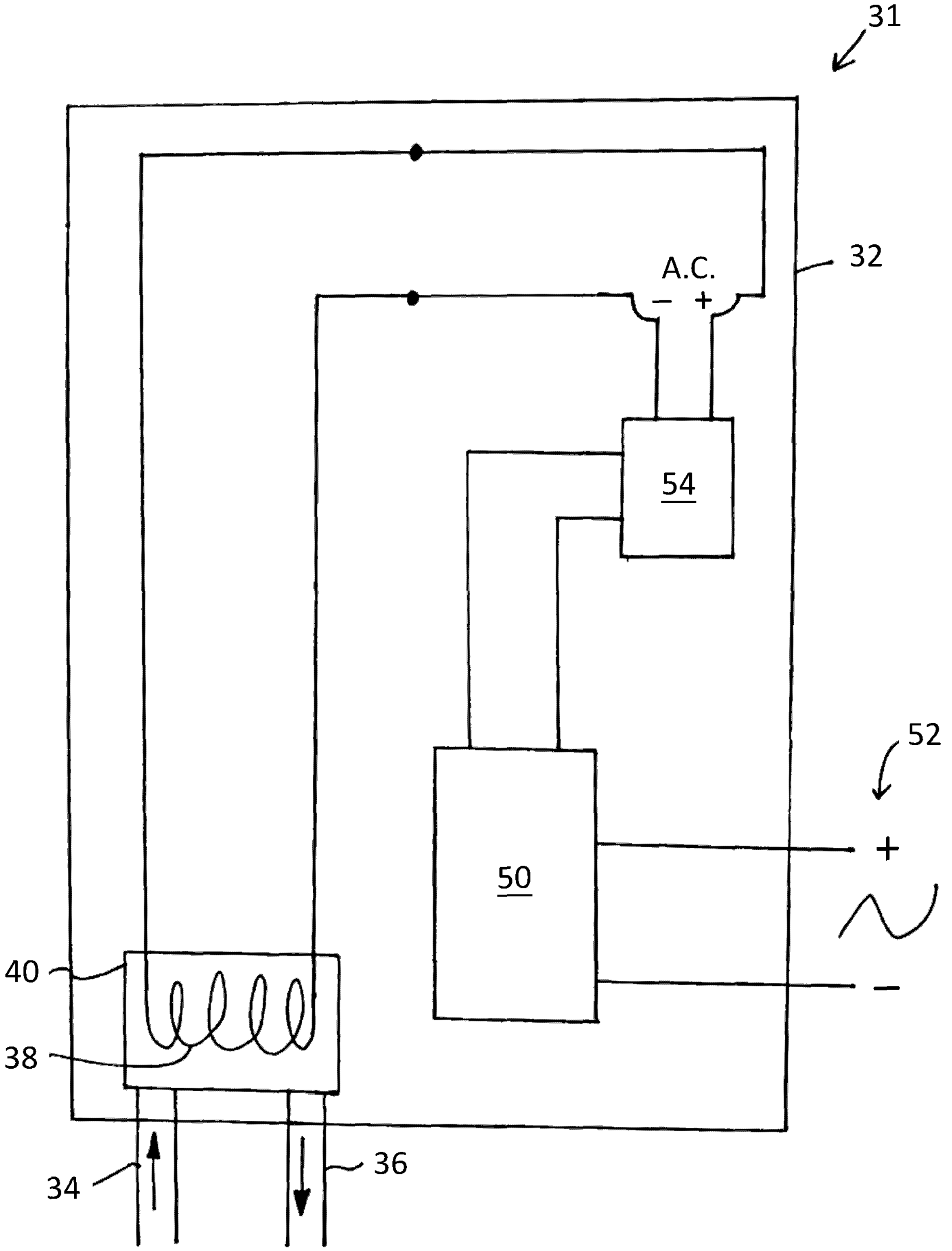
FIG. 2 shows a schematic view of a boiler according to another aspect of the invention.

Referring to FIG. 2, there is shown schematically a water heater 31 used to heat water for use in a standard radiator heating water circuit. Various aspects of the boiler and boiler system will be described in detail with reference to non-limiting examples. Other details will be apparent to the skilled person. In particular, aspects (including undescribed aspects) of known boiler systems can be incorporated and used with this invention by the skilled person.

Generally, the boiler may be a tank-type boiler (known also as a system boiler), or a combi boiler, or any other known boiler type, or a furnace heater, such as an furnace air heater. The skilled person will be able to adapt the described embodiments to boiler types other than those described. As is known, these boiler types can be used to supply heating water (e.g. to a radiator circuit) or potable water (e.g. to a circuit of taps) or both. In other examples, instead of heating radiator water, there may be another type of heating fluid flowing through the heating system, e.g. another liquid, another gas (e.g. air) or oil or any combination thereof. In some such examples, In this example, the water heater 31 is a system boiler and comprises a boiler housing 32 to house its components. Often the boiler of this invention will be required to fit in a small space. In many examples, this invention includes features that make the boiler compact to allow the boiler to fit within the same housing or space footprint as a typical known boiler, even though the inventive boiler comprises a new component (as will be described in more detail below).

The boiler 31 is arranged to heat water in a first circuit, wherein the first circuit is a heating water circuit. The heating water circuit comprises multiple components, including standard domestic radiators (not shown) in addition to the boiler 31. Water is used as the heating fluid within the first circuit in this example: other known heating fluids can be used in other examples.

Relatively cold water from the first circuit enters the boiler 31 via a cold water input pipe 34, is heated and then relatively hot water exits the boiler 31 to the first circuit via a hot water output pipe 36. In this circuit, there is also provided a water pump (not shown).

The boiler 31 comprises an electric boiler vessel 40, which is located within the housing 32 between the input 34 pipe and output 36 pipe. The electric boiler vessel 40 is a closed, sealed vessel containing a first electric heating element 38 arranged to heat water passing through the vessel 40.

As per this invention, the first electric heating element 38 communicates with both a DC power supply and an AC power supply such that it can be powered by either or both of them.

In this example, the DC power supply is in the form of a battery pack 50, which is part of the heater 31 and is also located within the housing 32. In other examples, the DC power supply may be located externally of the heater.

In this example, the AC power supply comprises mains electric power 52.

The boiler also comprises a controller 54 arranged to control distribution of power to the first heating element 38 from the DC and AC power supplies 50, 52. The controller may be implemented in hardware or software or a combination thereof, as will be apparent to those skilled in the art.

In this example, the controller 54 comprises (not shown) a hardware thermostatic controller and optionally a further GUI thermostatic controller such that a user can easily input desired fluid heating demands and easily receive feedback on fluid heating operating parameters in a known manner.

In this example, the controller 54 also includes (not shown) an AC power supply adapter arranged to interface with the external AC power supply 22 to deliver AC power to the heating element 8 within a desired power configuration.

The controller 54 also includes a DC-AC converter (not shown separately from the controller in the drawings) located between the DC power supply and the heating element and arranged to interface with the DC power supply 22 to convert deliver DC to AC in a known manner before delivering power to the heating element within a desired power configuration.

In this example, the controller is arranged to control combining of the outputs from the AC power supply and the DC power supply to deliver only AC power to the heating element. A benefit of this feature is to make the input circuitry to the heating element simpler than when providing both AC and DC directly to the heating element (resulting in fewer wet circuit components (i.e. those containing fluid/water), which in turn results in enhanced for reliability, maintenance and space savings).

In other examples, the controller may be arranged to control combining of the outputs from the AC power supply and the DC power supply to achieve a different goal.

In other examples, the heater may (instead of a DC-AC converter) comprise an AC-DC converter located between the AC power supply and the heating element and arranged to interface with the AC power supply to convert deliver AC to DC in a known manner before delivering only DC power to the heating element within a desired power configuration. Again, a benefit of this feature is to make the input circuitry to the heating element simpler than when providing both AC and DC directly to the heating element. In this scenario, in some embodiments, the AC-DC converter may be located inside the boiler housing, and in other embodiments may be located outside the boiler housing.

The controller is arranged to take into account a number of factors when controlling apportionment of power to the heating element. In some cases (at any given time), it will be desirable to use the DC supply only; in other cases (at any given time), it will be desirable to use the AC supply only; and in other cases (at any given time), it will be desirable to use a combination of the DC and AC power supplies. In one example, the DC supply is used most of the time, and the AC supply is used during cold spells. In some examples, when heating hot water for drinking etc., then DC supply is used ideally (at least for the initial heating to provide a quick heating response time).

The controller is configured to control relative distribution of power from the DC and AC power sources taking into account any one or more of: the capacity of the or each heating element (e.g. what is the maximum safe load (e.g. peak power or duration of continuous powering) of a particular heating element); the capacity of the or each power supply; instantaneous demand for heating water or tap water (e.g. has a tap just been turned on/has a radiator just been activated from cold); forecasted demand for heating water or tap water; and instantaneous or forecasted available supply type. The controller may learn user behaviour over time (e.g. when showers occur, when one or more users usually wake up etc.). one or more sensors may provide sensed information to feedback data to the controller to enhance said learning.

In some examples, the first heating element may have a preferred power demand range and the controller is arranged to supply power within the preferred power demand range whilst varying the proportion of AC to DC power to the first heating element from 0:100 to 100:0 of AC:DC. In cases where demand is met entirely or largely by the DC power supply, a relatively large DC power supply may be needed. In some examples, the DC power supply is of a size such that 100% of the heating demand cannot be met solely by the DC power source. In other examples, a large DC power supply is provided and such demand can be met solely by the DC power source (see examples described later in this document).

In this example, the boiler is a fully electric boiler. i.e. the heat source is all electric. In other examples, the boiler may be part electric, e.g. part electric and part gas, or part electric and part other combustible fuel-a suitable combustible fuel may be natural gas, hydrogen gas, or propane gas or methane gas, or ethane gas, or butane gas, or a suitable combustible oil or woodchip or wood pellet or any combination thereof. In this way, some of the heating power is provided by the electric (DC and AC) component and some of it is provided by more traditional burnt fuel. This can help to add redundancy within the system, or can be used to operate efficiently in an environment where one or other power source is scarce. In this invention, the combined DC and AC power sources are large enough to supply all or nearly all of the power output of a typical boiler if required.

The features of the controller and the way in which power from the AC and DC sources is intelligently apportioned when powering the heating element that are described with reference to FIGS. 1 and 2 can be used in combination with the later described embodiments and protection is specifically sought for such combinations.

Figure 3:
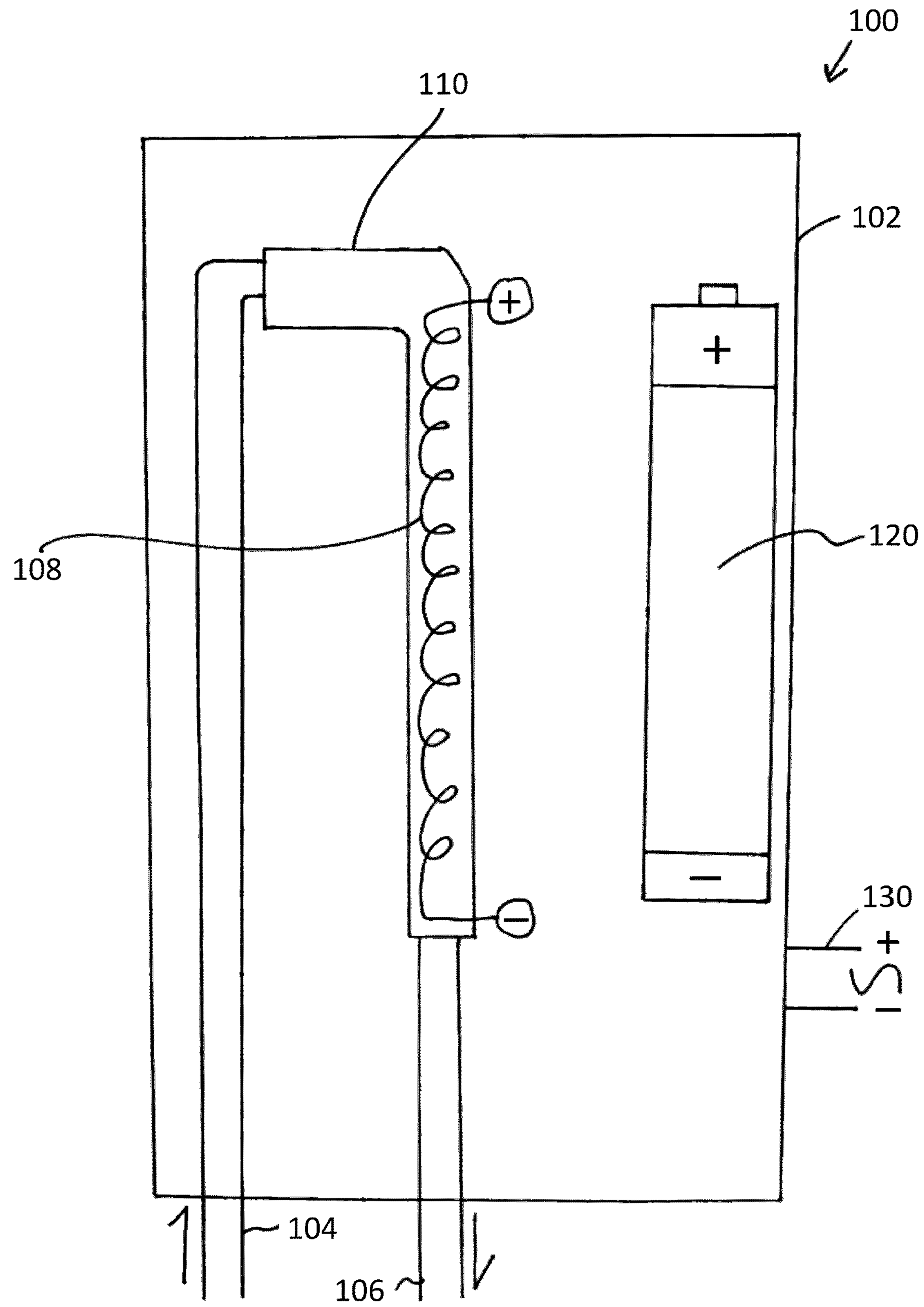
FIGS. 3 to 5 show schematic views of boilers according to yet further aspects of the invention.

Referring to FIG. 3, there is shown a water heater 100 similar to that described with reference to FIG. 1. Unless otherwise indicated, technical features are similar to those described with reference to any previously described embodiment (e.g. with reference to FIG. 1 or FIG. 2). The heater 100 is used to heat water for use in a standard radiator heating water circuit. Various aspects of the boiler and boiler system will be described in detail with reference to non-limiting examples. Other details will be apparent to the skilled person. In particular, aspects (including undescribed aspects) of known boiler systems can be incorporated and used with this invention by the skilled person.

In this example, the water heater 100 is a system boiler and comprises a boiler housing 102 to house its components.

The boiler 100 is arranged to heat water in a first circuit, wherein the first circuit is a heating water circuit. The heating water circuit comprises multiple components, including standard domestic radiators (not shown) in addition to the boiler 100. Water is used as the heating fluid within the first circuit in this example: other known heating fluids can be used in other examples.

Relatively cold water from the first circuit enters the boiler 100 via a cold water input pipe 104, is heated and then relatively hot water exits the boiler 100 to the first circuit via a hot water output pipe 106. The boiler 100 comprises an electric boiler vessel 110, which is located within the housing 102 between the input 104 pipe and output 106 pipe. The electric boiler vessel 110 is a closed, sealed vessel containing a first electric heating element 108 arranged to heat water passing through the vessel 110. As per this invention, the first electric heating element 108 is powered by a combined DC and AC power supply of the type described with reference to FIG. 1; in another example the combined DC and AC power supply may be of the type described with reference to FIG. 2, or related examples. For clarity, most of the common components shown in FIG. 1 are not replicated in FIG. 3 (e.g. the controller and its related circuitry).

In this example the DC power supply is in the form of a battery pack 120, which is also located within the housing 102. In this example, the boiler is a fully electric boiler. i.e. the heat source is all electric. In other examples, the boiler may be part electric, e.g. part electric and part gas, or part electric and part other combustible fuel-a suitable combustible fuel may be natural gas, hydrogen gas, or propane gas or methane gas, or ethane gas, or butane gas, or a suitable combustible oil or combustible solid or mulch or any combination thereof. In this way, some of the heating power is provided by the electric DC component and some of it is provided by more traditional burnt fuel. This can help to add redundancy within the system, or can be used to operate efficiently in an environment where one or other power source is scarce. In this invention, the DC power source is large enough to supply all or nearly all of the power output of a typical boiler if required.

In this example, the DC power supply has a capacity of 1 kWh.

In another example, for a small gas-electric hybrid boiler system setup, the battery capacity may be about 1 kWh—this might be useful in a small dwelling, such as a small apartment or it may be useful in a larger dwelling as a boost to the usual hot water supply.

In another example, for a larger gas-electric hybrid boiler system setup, the battery capacity may be about 3 to 5 kWh—this might be useful in a larger dwelling.

In another example, for a fully electric boiler system setup, the battery capacity may be about 5 kWh or above. In most cases, if the capacity is 15 kWh to 20 kWh, then water heating needs can be almost solely met by the boiler using DC electric power. E.g., for a fully electric boiler in a small apartment, the battery capacity may be about 10 kWh, in a medium house may be about 15 to 20 kWh, and in a large house may be about 25 to 30 kWh.

In some examples, the battery capacity may be about 90 kWh, e.g. to supply heating fluid and heated potable water to larger buildings.

In this example, the peak power output of the DC power supply is between 10 kW and 20 kW in some examples, and upto 200 KW in some examples. In low peak demand circuits, the peak power output may be 1 kW or 2 kW. Suitable peak power output provisions can be made according to specific circuit requirements and will be apparent to the skilled person. E.g. in one example scenario, a 90 kWh battery might provide 350 KW for 10 minutes.

In this embodiment, the battery pack 120 comprising a stack of batteries in a compact configuration. In this example, the 1 kWh DC battery pack 120 comprises one hundred replaceable or rechargeable cylindrical cells, such as standard sized 18650 cells (18 mm diameter and 65 mm length), each having a capacity of about 10 Wh. In this example, the rechargeable cells are arranged in a 10×10 stack for compactness and the entire stack can be removed from the battery pack 120 and recharged externally from the housing 102. In another example, the stack may be a 5×20 stack. Other suitable stack configurations will be apparent depending on the available space for the battery pack. The stack is configured to provide substantially consistent use over time of each cell within the stack in a known manner so that the stack operates effectively as a single unit. In some examples, the DC power source can be charged from renewable heat sources too, such as solar or wind or a heat pump or any other suitable source.

In other embodiments, the DC battery pack can be charged in situ, i.e. without removing any cells from the housing 102, via a charging connection (not shown).

Charging of the battery pack is carried out in this example by an AC to DC converter (not shown), and in examples where the charging is carried out in situ, the boiler further comprises an AC to DC converter located within its housing.

A typical 18650 cell has a voltage of 3.6V. In this example, the cells in the pack 120 are arranged in series, i.e. the effective voltage is about 3600V. The pack is well insulated. In other examples, the cells may be arranged differently, e.g. all in series (so that the maximum voltage in any single path is 3.6V) or in parallel paths having a few cells in series, e.g. 10 parallel paths, each having 10 cells (36V) in series. In some embodiments, cells can be arranged to provide substantially the same voltage as an AC input supply voltage—this makes combining AC and DC easier, and makes charging easier too. E.g. in the UK, a 240V battery pack may be provided.

In some embodiments, instead of a single battery pack, multiple battery packs or stacks within a battery pack are provided.

The boiler 100 housing also uses its AC connection 130 in order to power small electronic components (these have a relatively low power demand compared to the power required to heat water during normal boiler operation) such as switching circuitry, boiler display screen, boiler user interface, sensors, Wi-Fi, Bluetooth, sub 1 GHz comes etc, led lighting and other standard boiler components. Other such components include: igniter or spark generator; ignition electrode/ionisation electrode; pressure sensor/transmitter (water), also water pressure switch, flow sensor/switch (makes sure that the gas/air mix is flowing correctly before allowing ignition); combustion sensor (thermal switch-sometimes stated separately to temperature sensors by manufacturers); thermostat; thermocouple/PRT; control PCB; multi-media interface; power electronics for power-packs; pumps (simple electrical or possibly more complex with drive electronics) for water & gas. In some examples, this power may be provided by renewable heat sources too, such as solar or wind or a heat pump or any other suitable source. In some other examples, these small electronic components can be powered directly from the DC power supply.

In this example, the boiler 100 also comprises the controller (not shown) arranged to control any one or more of: heating, battery charging, battery discharging, system requirements, switching of the DC power supply as described with reference to the example of FIG. 1.

The relatively large battery of this invention produces heat. Other electrical components of the boiler also produce heat. The inventors have realised that a compact, efficient non-standard cooling system is required.

The boiler 100 of this embodiment also comprises a cooling system (not shown). The electronics can get hotter than on a normal boiler because of the large DC battery power involved and extra switching because of intelligent use of a large capacity DC battery, and operation of the controller and its related circuitry due to wanting to use DC-v-AC intelligently.

In some examples, the heater comprises a high-power switching module arranged to efficiently switch high currents such that power can be varied in the same resistant electric heating element and smoothly change fluid temperatures. This is especially important in the potable water circuit. This features allows pulse width modulation within the control circuitry. The high-power switching module may be arranged to switch 30 amps or more.

In examples containing a battery charging mechanism, the inventor further found that heat generation within the battery charging system can be a problem-specifically in an AC-DC converter battery charging system, which allows a voltage to charge the DC battery packs/cells. This type of battery charging system does not exist within any boiler systems or boiler housings yet, and generates heat. A further advantage of some examples of the present invention is therefore to use the cooling system (or to provide a further separate cooling system) as a heat sink to cool the battery charging mechanism too. The battery charging mechanism cooling system can be particularly useful since charging can (and should) also occur when the heating system is not on (i.e. when it is not heating a building or providing hot potable water, e.g., in the middle of the night). The present invention's cooling system allows for running the heating system to leach heat away during charging-only periods. The controller may be arranged to run fluid through the fluid heater system to cool the battery charging mechanism even when heated fluid is not required, e.g., the controller may act in response to predicting or being informed or sensing that the battery charging system should be cooled (e.g., via feedback from a temperature sensor located near the battery charger or after the battery has been continuously charging for a threshold minimum time period). This battery charging mechanism cooling feature can be implemented with any of the described embodiments containing a battery charger to create a new embodiment of the invention. In some examples (e.g., in which flow of the heating fluid/potable water is participating in the cooling), when the heating system is running (e.g., potable water or heated radiator fluid is being demanded), then cooling occurs via flow of the heating fluid/potable water past the controller/battery/battery charger. However, when the heating system is not running, this invention allows for operation of the charger cooling system (whether via flow of the heating fluid/potable water or via its own dedicated coolant within its own dedicated coolant circuit) specifically for the purpose of cooling the battery charger.

In some examples, the cooling system uses some of the water output from the radiators, which arrives at the cold input pipe 104 (typically at about 35-40 degC) for cooling the electronics, which are much hotter (ideally, the intention is to keep the electronic components well below 100 degC). In some examples, an element of the cooling system comprises locating the first circuit pipework from the input 104 within the boiler 100 adjacent or near to the components that require cooling. As a result, overall efficiency of the fluid heater is enhanced and its electronics can be made more compact/simpler due to a reduced need for perfect electronic efficiency with switching power.

The cooling system of this example includes a coolant circuit having a closed coolant pipe system (not shown) through which coolant is pumped. The closed coolant pipe system is configured to encourage heat transfer between the coolant and the boiler's cold water input so as to transfer heat away thereto as well as to encourage heat transfer between the coolant and the battery cells or other components so as to transfer heat away therefrom. This is achieved by routing the pipe system close to any one or more of the boiler components, battery cells and cold water input at appropriate locations.

In the example of FIG. 3, the boiler is configured to be compact. The housing has dimensions 400 mm width by 300 mm depth by 700 mm height and houses the first heater vessel 110 containing the first heating element 108, the DC power supply 102, and also the cooling system (in this example). In other embodiments, the housing may have dimensions: W390 mm, D270 mm, H600 mm; or W400 mm, D300 mm, H724 mm; or W400 mm, D310 mm, H724 mm; or W440 mm, D365 mm, H780 mm; or W440 mm, D364 mm, H825 mm; or W440 mm, D365 mm, H780 mm; or any other suitable dimensions that will be apparent to the skilled person.

Providing further compactness, the DC power supply is located at a front side, in use, of the housing, substantially fills the space between front and back ends of the housing, and also substantially fills the space between left and right sides of the housing. The boiler has walls on its left and right sides that are relatively inaccessible in use. The front side is relatively accessible and is usually used to access internal components when servicing.

In some examples, the housing 100 comprises an access door arranged to allow access to internal components of the heater (such as for servicing or repair) and the DC power supply is arranged within or integrally with the access door. This also adds to the overall compactness and also ensures that the DC battery does not need to be further removed or manipulated to access the internal boiler components (e.g. for repair/servicing).

In this example, the boiler 100 also comprises a thermal break or heat shield (not shown) located between the DC power supply and the first heater vessel; and also between the controller and the first heater vessel. The thermal break or heat shield may comprise any one or any combination of: an air gap; a gap filled (partly or fully) by a thermal insulation material; a gap filled (partly or fully) by an infrared-reflective material; a gap filled (partly or fully) by an insulator or low thermal conductivity material. In some examples, the heat shield may include an associated heat shield cooling mechanism arranged to transfer heat from the heat shield area towards another area in which it is safer to dissipate heat and comprising any one or more of:

- a fluid material that takes heat away from the area (e.g., from the heat shield area to a dissipation area (i.e. another area in which it is safer to dissipate heat than in the heat shield area));
- an active cooling mechanism, such as a Peltier device (that actively moves heat from one side to the other, e.g. towards another area in which it is safer to dissipate heat than in the heat shield area);
- a chilled cabinet located inside the boiler housing (similar to a typical refrigerator) and arranged to substantially enclose the DC power supply; and
- an air flow mechanism, such as a blower, arranged to draw air in from outside the housing, or from inside the housing, to provide the required cooling effect.

The electric heating element can be wrapped around pipes or components of the first circuit-benefits include ease of manufacture, ease of reconfiguration/replacement/upgrade/repair, if needed (because the heating element is located externally of the pipe/component (and the wet side need not be touched). The heating element is easily visibly and so it is convenient to inspect (e.g. during regular servicing) whether it is degraded. Such heating elements are also easier to clean. Such heating elements are not affected by sludge within the water circuit (this problem is common in radiator water circuits).

In other embodiments, the electric heating element can be placed inside a first circuit conduit/pipe-benefits include compactness, less heat loss to the environment (heat is retained almost entirely in the desired water circuit during normal heating operation).

In other embodiments, the electric heating element can be built into the walls of water circuit conduits of the first circuit-benefits are that these are robust, less susceptible to damage by dirty water, suffer less heat loss (than equivalent wrapped heating elements).

In other embodiments, the heating may occur in a chamber (rather than in a pipe). In such embodiments, pipes of the first circuit may lead to and from the chamber and one or more electric heating elements may be provide within the chamber at any location or embedded within walls of the chamber or wound around the chamber walls or any combination thereof. An advantage of using such a chamber rather than just heating the water/heating fluid as it passes through a fluid pipe of the circuit is that a longer or more circuitous path may be provided and may allow the heating fluid to remain in proximity to the heating element(s) for a longer time during which more heat can be transferred (relative to a direct path through a straight pipe section).

In yet further examples, dependent upon the specific application, there may be a combination of types and arrangements of electric heating elements used.

In a further embodiment (not shown), the boiler comprises a hybrid electric-gas boiler vessel instead of a vessel with only an electric heating element. In such an embodiment, within the same sealed, boiler vessel chamber are provided multiple heating mechanisms. One is an electric heating mechanism; the other is a gas burner mechanism.

The gas burner mechanism is of a known type. Instead of natural gas, the other mechanism might be a different fuel combustion burner (e.g. hydrogen gas, propane gas, oil). The electric heating mechanism can be in any suitable form. In this example, it is in the form of electric heating elements. In such examples, the DC power supply would still be sufficiently large to provide power to the electrical heating element sufficient to provide all or most of the required heated fluid/water. The boiler may be arranged in one example to heat water in a first circuit (such as for heating water to supply to a circuit of radiators). The electrical heating element or multiple such elements can be located anywhere in or around the burner vessel such that water can be heated by either or both of the gas and the electric heating mechanisms. The heating elements can be electrical wires that can be heated by passing electric current therethrough and arranged suitably to deliver heat where needed. (E.g. wrapped around a water pipe, or a baffle (or any other component within the burner vessel).

There may be a heat exchanger within the gas burner vessel. The heat exchanger is arranged to focus heat from the burning gas, the heated electric element(s), or both on the or each water pipe. The heat exchanger may be metal or ceramic. In one example, the heat exchanger may be in the form of one or more plates (e.g. metal plates) arranged partially or completely around the water pipe. Electric heating elements can be arranged between the plates. In another example, there may be a block of suitable material (e.g. a ceramic block) arranged around the water pipe.

Figure 4:
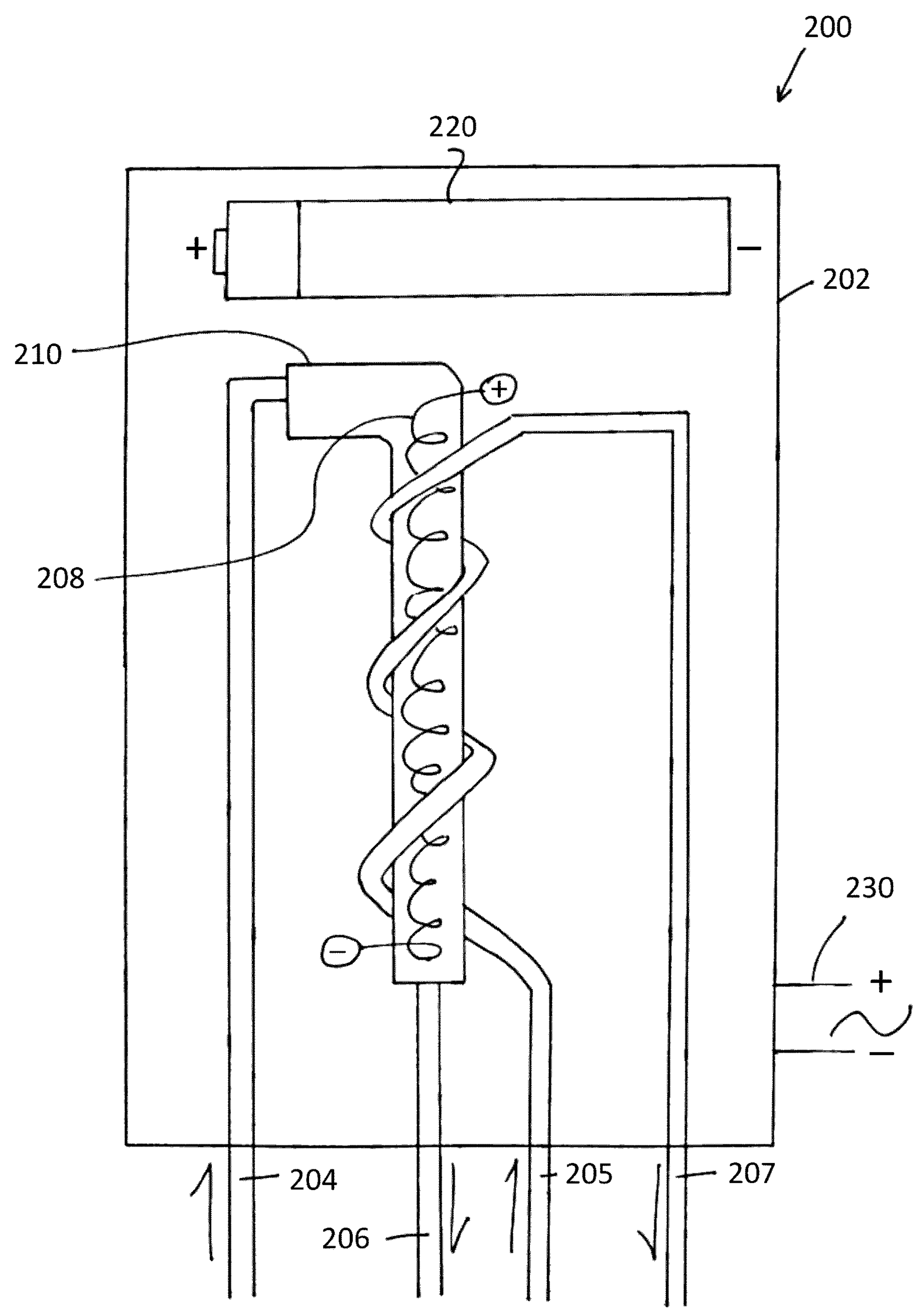

Referring to FIG. 4, in another example, a water heater 200 comprises a combi boiler arranged to heat water in a second circuit (for heating and supplying potable water) as well as a first circuit (for heating and supplying heating fluid to a radiator network). The second circuit has a different conduit arrangement, i.e. different pipework to the first circuit so that the fluids within the two circuits do not meet (so that the potable water is not contaminated by the radiator water).

Some components of the boiler 200 are similar to those of the boiler 100 and have similar reference numerals in the format 2*xx* instead of 1*xx*.

The boiler 200 comprises a housing 202 containing a first heater vessel 210 containing a first heating element 208, a DC power supply 202, and also a cooling system (not shown).

Relatively cold water from the first radiator circuit enters the boiler 200 via a cold radiator fluid input pipe 204, is heated and then relatively hot water exits the boiler 200 to the first radiator network circuit via a hot water output pipe 206.

The boiler 200 comprises an electric boiler vessel 210, which is located within the housing 202 between the input 204 pipe and output 206 pipe. The electric boiler vessel 210 is a closed, sealed vessel containing a first electric heating element 208 arranged to heat water passing through the vessel 210. As per this invention, the first electric heating element 208 is powered by a combined DC and AC power supply, in this example the combined power supply (similar to that of any previously described embodiment) is not shown apart from the DC power supply, which is in the form of a battery pack 220, which is also located within the housing 202. In this example, the boiler is a fully electric boiler. i.e. the heat source is all electric. In other examples, the boiler may be part electric, e.g. part electric and part gas, or part electric and part other combustible fuel-a suitable combustible fluid may be hydrogen gas or propane gas or a suitable combustible oil or combustible solid or mulch or any combination thereof. In this way, some of the heating power is provided by the (combined AC-DC) electric sources and some of it is provided by more traditional burnt fuel. This can help to add redundancy within the system, or can be used to operate efficiently in an environment where one or other power source is scarce. In this invention, the (combined AC-DC) electric power source is large enough to supply all or nearly all of the power output of a typical boiler if required.

In some such examples, e.g. in examples where an air intake is used to aid the combustion process (e.g. when burning a gas or combustible fuel), the cooling system can include using the air intake to cool the battery pack and/or electronic components since the air taken in will be relatively cool; at the same time, the air will become heated and will make the combustion process more efficient. This can be achieved by locating the air intake path near to the battery pack or components that need cooling.

In this example, the DC power supply has a capacity of 5 kWh.

Other modification examples (e.g. hybrid electric-gas power, AC-DC control, cooling configurations etc.) are similar to those described with reference to previously described embodiments (e.g. with reference to FIG. 3).

In the example of FIG. 4, the hot water in the first boiler vessel 210 is also arranged to heat water in the second circuit (without directly heating water in the second circuit). The second circuit comprises a potable water circuit (e.g. to supply tap water for washing, bathing, drinking etc.). Relatively cold water from the second circuit enters the boiler 200 via a mains cold water input pipe 205 (which is fed via a mains water pipe), is heated and then relatively hot potable water exits the boiler 200 to the second tap circuit via a hot water output pipe 207.

Between its input 205 and output 207, the second circuit comprises a pipe section that is configured to have heat transferred to it from the first vessel 210. In this example, this is achieved by locating said pipe section in close proximity to the vessel 210 such that heat can be effectively transferred to the pipe section in use. The pipe section comprises a helical pipe that is wound around the vessel 210 to further aid heat transfer therebetween. In another example, instead of or additionally to, the helical pipe being wound around the vessel, water is heated via a wet heat transfer box. This avoids the need to heat radiator water each time potable water is to be heated. In such examples, water in either circuit can be heated independently-pipes from both circuits enter a heat exchanger vessel, in which heating of either or both circuits can occur.

Figure 5:
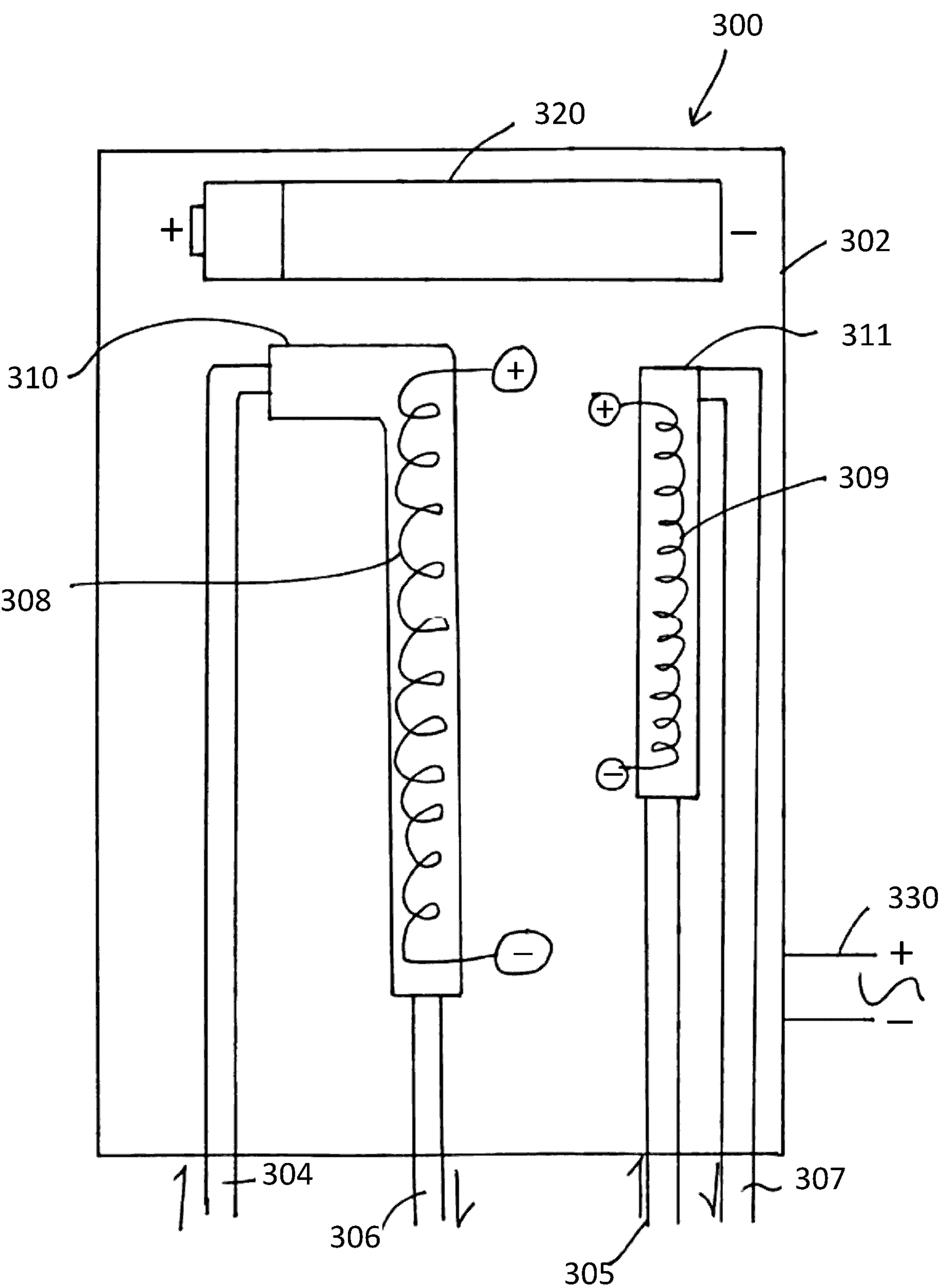
Figures 6A, 6B, 6C, 6D:
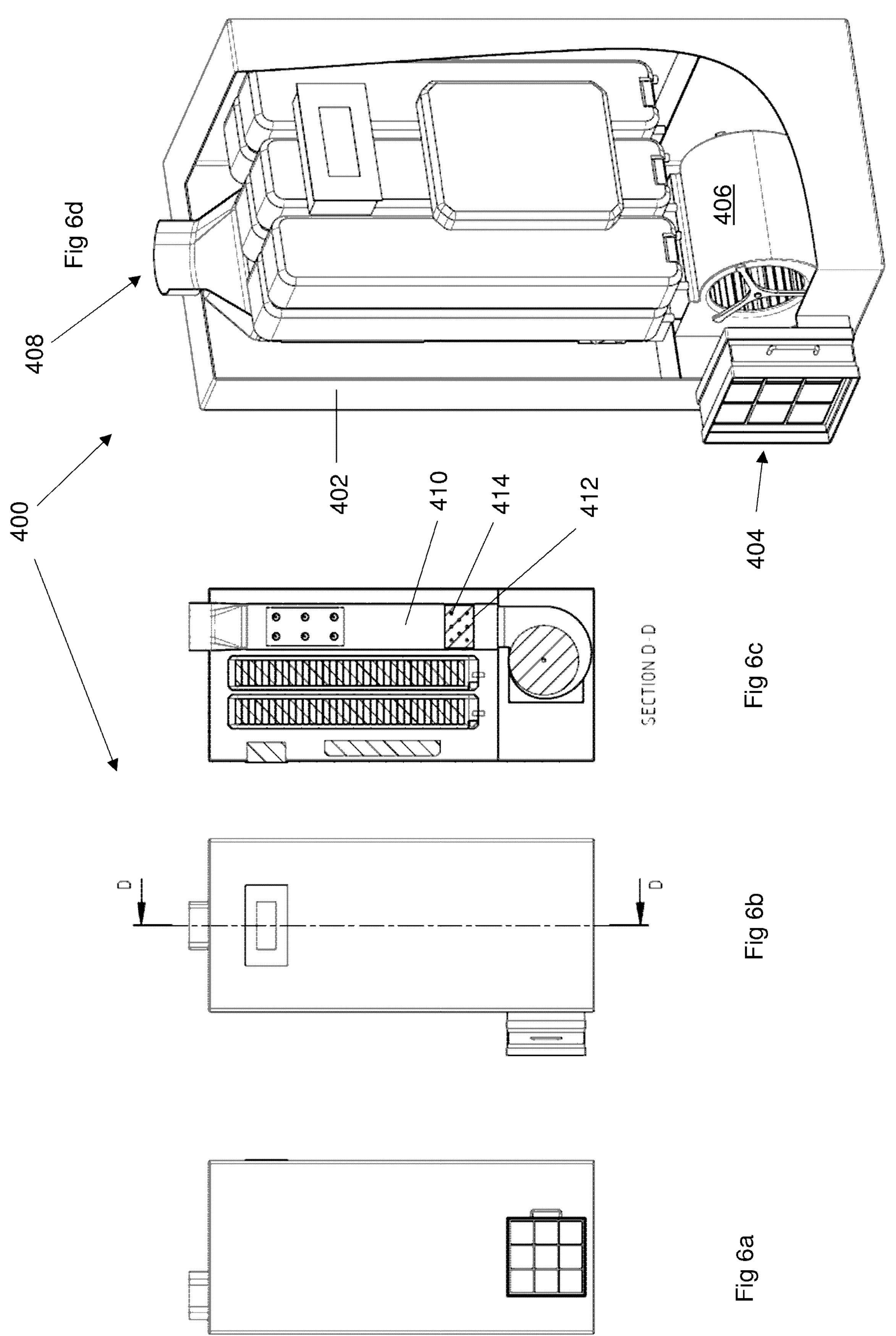
FIGS. 6*a* to 6*d* show rear, side, cross-section (through D-D shown in the side view), and perspective cut-away views respectively of a furnace according to yet another aspect of the invention.

The battery pack 220 is located at the top of the housing 202 away from the heating vessel 210 and shielded therefrom by a heat shield (not shown) as described in relation to other examples. Referring to FIG. 5, in another example, a water heater 300 comprises a combi boiler arranged to heat water in a second circuit (for heating and supplying potable water) as well as a first circuit (for heating and supplying heating fluid to a radiator network). The system of FIG. 5 is similar to that of FIG. 4 (with similar reference numerals in the format 3*xx* instead of 2*xx*) except that potable water in the second circuit is primarily heated via a different mechanism. The combi boiler 300 comprises an electric boiler vessel 310, which is located within a housing 302 between an input 304 pipe and output 306 pipe. The electric boiler vessel 310 is a closed, sealed vessel containing a first electric heating element 308 arranged to heat water passing through the vessel 310.

As per this invention, the first electric heating element 308 is powered by a combined DC-AC power supply, the components of which are not shown (but which are similar to those of any previously described embodiment), apart from a DC power supply in the form of a battery pack 320, which is also located within the housing 302. In this example, the boiler is a fully electric boiler. i.e. the heat source is all electric. In other examples, the boiler may be part electric, e.g. part electric and part gas, or part electric and part other combustible fuel-a suitable combustible fuel may be hydrogen gas or propane gas or a suitable combustible oil or combustible solid or mulch or any combination thereof. In this way, some of the heating power is provided by the electric (combined AC-DC) sources and some of it is provided by more traditional burnt fuel. This can help to add redundancy within the system, or can be used to operate efficiently in an environment where one or other power source is scarce. In this invention, the (combined AC-DC) power source (and, in fact, the DC source alone) is large enough to supply all or nearly all of the power output of a typical boiler if required.

In this example, the DC power supply has a capacity of 20 kWh.

In contrast to the example of FIG. 4, the electric heating mechanism of the FIG. 5 example comprises a second electric heating element arranged to deliver heat to the water in the second circuit efficiently. In this example, the boiler 300 comprises a second electric boiler vessel 311 containing the second electric heating element 309 within the path of the second circuit between the input pipe 305 and the output pipe 307. In this example, the DC battery pack powers the second electric heating element 309 too.

Various modifications may be made to this invention without departing from its scope.

Optionally, in examples where the heater comprises two (or more) heating elements (whether the heating elements heat fluid in a single circuit or in different circuits; or whether the heating elements are housed in the same heater vessel or in different heater vessels), the controller is arranged to power the first heating element only via the DC power supply and the second heating element only via the AC power supply, or vice versa. This feature reduces the need for more complex circuitry and therefore reduces the risk of circuitry failure. Further, if one source fails, the other still works.

Optionally, in examples where the heater serves two (or more) circuits within which fluid is to be heated (whether there are multiple heating elements or only a single heating element), the controller is arranged to power the or each relevant heating element using only the DC power supply when heating liquid in the first circuit and using only the AC power supply when heating water in the second circuit, or vice versa. This feature takes into account that a particular power source (AC or DC) may be general more efficient for a particular fluid circuit or type of fluid circuit (e.g. radiator circuit or potable water circuit) and reduces the need for more complex circuitry and therefore reduces the risk of circuitry failure.

Although examples of the invention have been described in relation to water boilers, the same inventive concepts can be applied to other (partially or wholly) electric fluid heaters, for example, air heaters (also known as furnaces) are common in North America. Such systems usually include a fan to blow the heated air—this is not shown in any drawings for clarity. Systems that heat other fluids will be apparent to those skilled in this field.

FIGS. 6*a* to 6*d* show one such example—according to this embodiment, a furnace heater 400 is arranged to provide heated (or cooled) air. The furnace 400 includes a housing 402, an air intake 404, and a fan 406 located near the air intake to draw air from the environment into the furnace housing 402. The housing also has an air output 408 through which heated air exits the furnace housing. Between the intake 404 and the output 408 is an air duct 410. The skilled person in this field will be aware of variations of such furnace air heaters.

The furnace comprises a heat exchanger 412 arranged to provide heat to air passing through the duct 410. In this example, the heat exchanger is located within the duct (but may be located outside the duct in other examples). In this example, multiple electric heating elements 414 are located inside the body of the heat exchanger 412. The electric heating elements 414 are arranged to supply heat when powered by an electric current. The furnace comprises a large DC power source, in the form of six DC battery packs in this example (other configurations will be apparent). The DC power source in this example comprises a power source of the type described previously in relation to boilers. An AC power source (not shown) is also arranged to power the heating elements. A controller (not shown) is arranged to control distribution of power to the heating elements from the DC power supply and the AC power supply in a similar manner to that described above in relation to boiler embodiments. In this example, the battery capacity is about 5 kWh—this value may be different in other examples as discussed in relation to earlier examples. In this example, the power packs provide surge and steady state power for heating elements within the heated air delivery system.

In some examples, a second fluid circuit for hot water is also provided—in such examples, on demand hot water may be managed within the furnace by power electronics (used to power electronic components of the furnace). The number/combined power of DC powerpacks may be adjusted to suit specific installation requirements. In some examples, the power electronics are cooled by circulating air or other fluid, and may be used to preheat air-flow through the duct. The modular DC power packs are designed for easy replacement, and are conveniently located at an accessible side of the housing. There is little wasted space within the furnace housing 402. The battery pack is both useful and fills space that is usually empty.

In other examples, the fluid heater comprises a portable air heater (similar to the above-described furnace but smaller). In such examples, the first circuit (as claimed in claim 1) is within the standalone fluid heater itself. In such examples, the portable air heater comprises a small fan blower in conjunction with one or more electric heating elements (of the type described in relation to earlier examples) powered by a DC battery pack and by an AC power source (e.g. mains AC). A controller is arranged to control distribution of power to the heating elements from the DC power supply and the AC power supply in a similar manner to that described above in relation to earlier embodiments. In some other examples, the portable heater does not have a fan blower; instead the heater comprises a natural convection heater or radiative heater. In some such examples, AC could be disconnected (or unavailable, e.g. during a power cut) and the heater could be run only from the DC power supply.

In such examples, the DC battery capacity may be at least 0.2 kWh power supply, e.g. about 0.5 kWh or about 1 kWh. Peak power output may be about 3 kW DC and 3 kW AC combined in some examples.

The housing of such a portable air heater would be smaller than a typical furnace, e.g. about 20 cm in diameter, and 35 cm in height.

In examples with multiple fluid circuits, e.g. combi boiler examples, where there are other power sources in addition to the combined AC-DC electric power source, the first heating element may be arranged to heat fluid in one of the first and second circuits, and the combustion heater may be arranged to heat fluid in the other of the first and second circuits, e.g. the tap water is heated only by the electric sources and the heating water is heated by the combustible fuel source.

More than one heating element may be provided per heater vessel.

For any embodiment described as solely electric, the skilled person will appreciate that it may alternatively be provided in a part electric-part combustible fuel format.

Any of the examples may include a DC power supply interface arranged to receive the DC power supply, wherein the DC power supply interface is configured to receive more than one type of DC power supply, such as any combination of an Ni-MH battery cell pack, an Ni—Cd battery cell pack and a lithium battery cell pack or a mixed pack containing a mixture of any of these types of cells. Supercapacitors can be used instead of or in addition to a traditional DC battery pack to provide the DC power source.

Any of the examples that include DC power supply cells may include a safety shut-off mechanism arranged to disconnect the cells from powering the electric heating element. The safety shut-off mechanism may comprise a master switch or automatic master switch; in some examples the safety shut-off mechanism comprises a contactor. Advantageously, a safe, simple DC switching mechanism is thereby provided.

Electric heating element(s), or a battery, or both, along with a control mechanism (e.g. control electronics and/or software) to control the amount of heating provided by DC. AC or a combination thereof can be retro-fitted to an existing electric, gas (or other combustible fuel) or gas-electric hybrid fluid heater to provide a fluid heater within the scope of this invention.

The inventive fluid heater may be more powerful and more efficient as previously described. Such examples may be particular suitable for retro-fitting electrical heating capability to existing AC electric boilers or gas boilers. For example, electric heating elements may be coated on, coated within, sprayed, contained in, wrapped around, partially or totally embedded in, or otherwise associated with, a duct section at or near: its exit from a combustible fuel burner vessel: its entrance to the burner vessel; or both. The heating element(s) may be powered by DC, AC or a combination thereof. In some examples, a battery, such as a large battery of the type previously described, may be attached to the burner vessel along with a control mechanism (e.g. control electronics and/or software) to control the amount of heating provided by the electric heating element(s) compared to the combustible fuel source. When attached to an AC electric boiler, a DC power pack may be added along with suitable control electronics to allow a balanced use of DC and AC depending on demand requirements and/or supply.

Within the examples in which the circuit comprises a heating water circuit such as a radiator circuit, the boiler/heater also comprises a pump such as a water (not shown for clarity in any of the drawings) as is known in the field.

Within the examples in which the circuit comprises a potable water circuit, the input is usually from a mains water input, which is pressurised and so no pump is required. In some examples, where the input is from an unpressurised clean water source, then a pump may be provided.

In any, all or some embodiments, the battery charging mechanism is arranged to charge the DC power supply taking into account, and in response to, any one or more of: current DC power supply battery charge level; capacity of the or each power supply; instantaneous demand for heating water or tap water; forecasted demand for heating water or tap water; instantaneous or forecasted available supply type; and household demand, local demand, national demand, international demand or any combination thereof. Typically, the battery pack is charged at off-peak times, e.g. in the middle of the night or middle of the day (when the controller is told that demand is usually low, or the controller learns that demand is low, in some cases).

In any of the described examples, the, any or each heating element may be any element that emits heat when an electric current is passed therethrough, such as any resistive wire, or arrangement of wires, that emits heat when a current is passed therethrough, such as (but not limited to):

- Thin film (polyimide over conductive metal);
- Ceramic (ceramic sheath with embedded nickel chrome aluminium etc.) wire;
- Bare wire (nickel, nichrome, Kanthal, stellites etc. Tungsten); Encapsulated wire—e.g. silicone jacketed nichrome;
- Mineral insulated wire-copper sheath/nichrome, cupronickel/Inconel, steel sheath/nickel,
- Inconel sheath/nickel allow wire and all sorts of mixtures of these. Elements may be drawn to size or manufactured at finish size etc. Insulation generally Al2O3 or MgO;
- Plain wires, spiralled (helical) wires, busbar wires with wound elements between.

In any example where a single heating element is described, it may be replaced by one or more different heating elements as will be apparent to the skilled reader. For example, one or more of the electric heating elements may comprise a conductive heating element coating on any one or more of: an interior surface of an at least one duct wall; an exterior surface of the at least one duct wall; and a surface of the burnt fuel heat exchanger, baffle or any other component. One or more of the electric heating elements may comprise an inductive heating element, e.g. such that it/they can be powered by induction (without direct contact).

In some cases, multiple distinct electric heating elements are arranged to heat fluid in distinct sections of a duct. In some examples, multiple distinct sections of heating element are provided within the fluid duct, and each section may be controlled together or separately, e.g. to provide different levels of heating at different section locations. This is efficient in situations where combustion heating levels are different in different locations of the burner vessel—the electric heating element(s) may provide less heating in sections where the burner is able to provide more heating and the electric heating element(s) may provide more heating in sections where the burner is able to provide less heating. In another use case, it may be desirable to provide different heating levels at different sections of the fluid path, such as upon initial heating start-up when a fluid is first heated from cold, such as when a tap is first turned on, more intense heating may be provided at the beginning of the fluid path than at the end because the initial input fluid is particularly cold.

In some of these examples, the elements may be completely embedded in the fluid duct such that no part of them emerges or protrudes from the duct (e.g. there is no external electrical connection point). In some examples in which the heating element is to be provided in distinct zones (not continuously along the entire length of the duct), gaps between the distinct zones can be formed by masking gap sections of the duct (e.g. with a spray mask) during the coating/spraying process.

In some examples, the invention provides a single-housing fluid heater having an electric heating element arranged to be powered by both a large DC supply and an AC supply with an onboard controller and controller cooling system. The inventor realised that components of this type of system have significantly different cooling needs.

In examples containing a battery charging mechanism, the inventor further found that heat generation within the battery charging system can be a problem-specifically in the AC-DC converter charging system, which allows a voltage to charge the DC battery packs/cells. This type of battery charging system does not exist within any boiler systems or boiler housings yet, and generates heat. A further advantage of some examples of the present invention is therefore to use the cooling system (or to provide a further separate cooling system) as a heat sink to cool the battery charging mechanism too. The battery charging mechanism cooling system can be particularly useful since charging can (and should) also occur when the system is not heating a building or providing hot potable water (e.g., in the middle of the night). The present invention's cooling system allows for running the heating system to leach heat away during charging. The controller may be arranged to run fluid through the fluid heater system to cool the battery charging mechanism even when heated fluid is not required, e.g., the controller may act in response to predicting or being informed or sensing that the battery charging system should be cooled (e.g., via feedback from a temperature sensor located near the battery charger or after the battery has been continuously charging for a threshold minimum time period).

In some examples, the controller may be arranged to provide a shower saver algorithm as follows: if DC power is unavailable (e.g., if the battery level is low or zero), then switch to powering the electric heating element via AC power only. The direct (i.e., on-demand when a water tap is turned on) hot water is then supplied only by AC power; the supplied power is then less than the large DC power supply can supply. Therefore, the controller is programmed to ensure there is always some minimum threshold of DC capacity left, e.g., to allow a high-power shower etc. This feature can be selectively activated or deactivated by a user via a user interface that sends instructions to the controller. In some examples, the minimum threshold of DC capacity may be 5% of total battery capacity to be held in reserve.

In some examples, the invention provides a fluid heater that achieves safe provision of large, modular power packs that are easily replaceable within the confines of the heater's housing. The large power packs are of a sufficient capacity such that the entire heating load for a typical domestic dwelling can be provided for via the electric power source. This size of power pack is located safely within the confines of the housing using a heat shield as previously described. Because the battery charger cooling mechanism may often be operated at different times to the controller and battery cooling mechanisms, it may comprise, or include, a separate or distinct cooling mechanism to the controller and battery cooling mechanisms.

In some cases, there may be multiple cooling mechanisms, e.g. at least one cooling mechanism associated with the controller, at least one cooling mechanism associated with the battery and at least one cooling mechanism associated with the battery charger.

In some examples, the cooling system might be a passive cooling system (instead of or in addition to the previously-described cooling systems) arranged to transfer heat away from components to be cooled (such as the boiler electronics or DC power supply or battery charger or any combination thereof). The passive cooling system may not comprise a flowing fluid. The passive cooling system may comprise a thermal heatsink (e.g. an aluminium block, such as a 20 mm×40 mm×80 mm aluminium block, with natural convection fins for heat dissipation into the environment. The passive cooling system may comprise a large thermal mass, such as the heater housing.

The invention claimed is:

1. A partially or wholly electric fluid heater arranged to heat fluid in a first circuit, the fluid comprising heating fluid or tap water, wherein the heater comprises a fluid heater housing arranged to house:

a first electric heating element arranged to heat fluid in the first circuit, wherein the first heating element is arranged to be powered by both an AC power supply and a DC power supply having a capacity of at least 1 kWh;

a controller arranged to control distribution of power to the first heating element from the DC power supply and the AC power supply, wherein the controller comprises or is operatively connected to a power switching module arranged to vary power delivered to the first electric heating element by switching currents of 30 amps or more; and a cooling system arranged to provide active cooling to the controller;

wherein the heater further comprises a battery charging mechanism, in communication with the controller, wherein the battery charging mechanism is arranged to charge the DC power supply taking into account instantaneous demand for heating water or tap water;

wherein the controller is arranged to control combining of the outputs from the AC power supply and the DC power supply, and wherein the controller is arranged to vary relative distribution of the combined outputs from the AC power supply and the DC power supply, taking into account one or more of:

capacity of the or each heating element;

capacity of the or each power supply;

instantaneous demand for heating water or tap water;

forecasted demand for heating water or tap water; and instantaneous or forecasted available supply type.

2. The heater of claim 1, wherein the fluid heater housing is arranged to house the DC power supply.

3. The heater of claim 1, wherein the cooling system is arranged to provide cooling to both the controller and the DC power supply.

4. The heater of claim 1, wherein the DC power supply comprises a battery pack.

5. The heater of claim 1, wherein the DC power supply has a capacity of at least 5 kWh.

6. The heater of claim 1, wherein the AC power supply comprises an AC power supply adapter arranged to interface with an external AC power supply, such as a mains AC power supply.

7. The heater of claim 1 further arranged to heat fluid in a second circuit, wherein the fluid in the first circuit comprises heating fluid and the fluid in the second circuit comprises tap water or vice versa; and wherein the first heating element is arranged to heat fluid in the first circuit, or in both the first circuit and the second circuit.

8. The heater of any claim 1 wherein, at any given moment, the first heating element is arranged to be powered solely by either the DC power supply or the AC power supply.

9. The heater of claim 1 comprising:

a DC-AC converter between the DC power supply and the first heating element such that the first heating element is arranged to receive only AC power from either the AC power supply, the DC power supply or both; or an AC-DC converter between the AC power supply and the first heating element such that the first heating element is arranged to receive only DC power from either the AC power supply, the DC power supply or both.

10. The heater of claim 7 wherein the controller is arranged to power the first heating element using only the DC power supply when heating liquid in the first circuit and using only the AC power supply when heating water in the second circuit, or vice versa.

11. The heater of claim 1 further comprising a second heating element arranged to heat fluid in the first circuit, the second circuit, or both.

12. The heater of claim 1 wherein the battery charging mechanism, further takes into account any one or more of:

current DC power supply battery charge level;

capacity of the or each power supply;

forecasted demand for heating water or tap water;

instantaneous or forecasted available supply type;

household demand.

13. The heater of claim 7 further comprises a combustion heater, arranged to heat fluid in the first circuit, the second circuit or both.

14. The heater of claim 13 wherein the first heating element is arranged to heat fluid in the first circuit, and the combustion heater is arranged to heat fluid in the second circuit.

15. The heater of any claim 11 wherein the fluid heater housing is arranged to house a first boiler vessel containing the first heating element.

16. The heater of claim 15 wherein the first boiler vessel further contains the second heating element.

17. The heater of claim 15 wherein the housing is further arranged to house a second boiler vessel containing a second heating element.

18. The heater of claim 1 wherein the controller comprises a hardware thermostatic controller and a further GUI thermostatic controller.

19. The heater of claim 1, wherein the fluid heater housing has dimensions 390 to 440 mm width by 270 to 365 mm depth by 600 to 825 mm height.

20. A method of heating a fluid in a partially or wholly electric fluid heater arranged to heat fluid in a first circuit, the fluid comprising heating fluid or tap water, wherein the heater comprises a fluid heater housing arranged to house:

a first electric heating element arranged to heat fluid in the first circuit, wherein the first heating element is arranged to be powered by both an AC power supply and a DC power supply having a capacity of at least 1 kWh;

a controller arranged to control distribution of power to the first heating element from the DC power supply and the AC power supply, wherein the controller comprises or is operatively connected to a power switching module arranged to vary power delivered to the first electric heating element by switching currents of 30 amps or more; and a cooling system arranged to provide cooling to the controller; the method comprising:

controlling the distribution of power to the first heating element from the DC power supply and the AC power supply, and optionally solely by either the DC power supply or the AC power supply at any given moment;

wherein the heater further comprises a battery charging mechanism, in communication with the controller, wherein the battery charging mechanism is arranged to charge the DC power supply taking into account instantaneous demand for heating water or tap water;

wherein the controller is arranged to control combining of the outputs from the AC power supply and the DC power supply, and wherein the controller is arranged to vary relative distribution of the combined outputs from the AC power supply and the DC power supply, taking into account one or more of:

capacity of the or each heating element;

capacity of the or each power supply;

instantaneous demand for heating water or tap water;

forecasted demand for heating water or tap water; and instantaneous or forecasted available supply type.

* * * * *